(12) United States Patent
Akita et al.

(10) Patent No.: US 8,795,923 B2
(45) Date of Patent: Aug. 5, 2014

(54) REINFORCED ELECTROLYTE MEMBRANE FOR FUEL CELL, FUEL CELL MEMBRANE-ELECTRODE ASSEMBLY, AND SOLID POLYMER ELECTROLYTE FUEL CELL COMPRISING THE FUEL CELL MEMBRANE-ELECTRODE ASSEMBLY

(75) Inventors: Yasuhiro Akita, Nagoya (JP); Takeshi Nagasawa, Okazaki (JP); Takeyuki Suzuki, Okayama (JP); Toyohiro Matsuura, Okayama (JP)

(73) Assignees: Toyota Jidosha Kabushiki Kaisha, Toyota-Shi (JP); W.L. Gore & Associates Co. Ltd., Tokyo (JP)

( * ) Notice: Subject to any disclaimer, the term of this patent is extended or adjusted under 35 U.S.C. 154(b) by 385 days.

(21) Appl. No.: 12/919,276

(22) PCT Filed: Oct. 17, 2008

(86) PCT No.: PCT/JP2008/068881
§ 371 (c)(1),
(2), (4) Date: Aug. 25, 2010

(87) PCT Pub. No.: WO2009/107273
PCT Pub. Date: Sep. 3, 2009

(65) Prior Publication Data
US 2011/0008708 A1 Jan. 13, 2011

(30) Foreign Application Priority Data
Feb. 26, 2008 (JP) .................................. 2008-044571

(51) Int. Cl.
*H01M 8/10* (2006.01)

(52) U.S. Cl.
USPC .......................................... 429/483; 429/482

(58) Field of Classification Search
CPC ........................................................ H01M 8/02
USPC ........................... 429/479–483, 491–496, 535
See application file for complete search history.

(56) References Cited

U.S. PATENT DOCUMENTS 5,476,589 A 12/1995 Bacino
6,613,203 B1 9/2003 Hobson et al.
(Continued)

FOREIGN PATENT DOCUMENTS

CA 2 596 007 A1 8/2006
CA 2659968 A1 3/2008
(Continued)

OTHER PUBLICATIONS

R. Iwata et al., "Study of the Perfluorosulfonic Acid Membrane Degradation and Development of Highly Nafion® Membrane," (Abstract) Fuel Cell Symposium, pp. 105-107 (2006).
(Continued)

*Primary Examiner* — Barbara Gilliam
(74) *Attorney, Agent, or Firm* — Kenyon & Kenyon LLP

(57) ABSTRACT

The present invention provides a reinforced electrolyte membrane for fuel cell comprising a porous substrate impregnated with a polyelectrolyte liquid dispersion, wherein either the maximum tensile strength in the machine direction (for sheet processing) (MD) or the maximum tensile strength in the transverse direction (TD; vertical to the MD direction) for the electrolyte membrane is 70 N/mm$^2$ or more at 23° C. at a relative humidity of 50% or 40 N/mm$^2$ or more at 80° C. at a relative humidity of 90%. This reinforced electrolyte membrane for fuel cell, in which the amount of fluorine ions eluted as a result of deterioration of electrolyte membrane components in particular is reduced, has excellent durability.

6 Claims, 4 Drawing Sheets

(56) References Cited

U.S. PATENT DOCUMENTS

| | | |
|---|---|---|
| 2003/0008198 A1 | 1/2003 | Mukoyama et al. |
| 2003/0013774 A1 | 1/2003 | Mukoyama et al. |
| 2003/0082308 A1 | 5/2003 | Kinoshita et al. |
| 2003/0152820 A1 | 8/2003 | Kato |
| 2003/9152720 | 8/2003 | Kato |
| 2004/0045814 A1* | 3/2004 | Bahar et al. .......... 204/252 |
| 2004/0084304 A1 | 5/2004 | Thompson |
| 2005/0227132 A1 | 10/2005 | Hori et al. |
| 2006/0040175 A1 | 2/2006 | Zuckerbrod et al. |
| 2008/0138685 A1 | 6/2008 | Kaneko et al. |
| 2009/0208806 A1* | 8/2009 | Izuhara et al. .......... 429/33 |
| 2010/0233571 A1 | 9/2010 | Takeshita |

FOREIGN PATENT DOCUMENTS

| | | |
|---|---|---|
| CN | 1608099 A | 4/2005 |
| CN | 1926705 A | 3/2007 |
| CN | 101120419 A | 2/2008 |
| DE | 602 15 554 T2 | 7/2007 |
| JP | 2003-51320 | 2/2003 |
| JP | 2003-55568 | 2/2003 |
| JP | 2003-100318 | 4/2003 |
| JP | 2003-297394 | 10/2003 |
| JP | 2004-178995 | 6/2004 |
| JP | 2004-288495 | 10/2004 |
| JP | 2005-50561 | 2/2005 |
| JP | 2005235437 | 2/2005 |
| JP | 20055235437 | 2/2005 |
| JP | 2005-520002 | 7/2005 |
| JP | 2005267904 | 9/2005 |
| JP | 2005-285757 | 10/2005 |
| JP | 2005276847 | 10/2005 |
| JP | 2006-32157 | 2/2006 |
| JP | 2006504848 | 2/2006 |
| JP | 2006504848 A | 2/2006 |
| JP | 2006-59756 | 3/2006 |
| JP | 2007-42584 | 2/2007 |
| JP | 2007095433 | 4/2007 |
| JP | 2007-112907 | 5/2007 |
| JP | 2007-280688 | 10/2007 |
| JP | 2008027586 | 2/2008 |
| JP | 2008078091 | 3/2008 |
| JP | 2008098006 | 4/2008 |
| JP | 2008288193 | 11/2008 |
| WO | 03022912 | 3/2003 |
| WO | 2004041529 | 5/2004 |
| WO | WO 2006/087995 A1 | 8/2006 |
| WO | WO 2007/007819 A1 | 1/2007 |
| WO | 2008026666 A1 | 3/2008 |

OTHER PUBLICATIONS

Office Action issued Mar. 5, 2012 in DE 11 2008 003 733.7 and English translation thereof.
Office Action issued Sep. 6, 2012 in CN 200880127517.X.
Notice of Allowance issued on Feb. 13, 2014 in U.S. Appl. No. 13/124,602.

* cited by examiner

REINFORCED ELECTROLYTE MEMBRANE FOR FUEL CELL, FUEL CELL MEMBRANE-ELECTRODE ASSEMBLY, AND SOLID POLYMER ELECTROLYTE FUEL CELL COMPRISING THE FUEL CELL MEMBRANE-ELECTRODE ASSEMBLY

CROSS-REFERENCE TO RELATED APPLICATIONS

This application is a national phase application of International Application No. PCT/JP2008/06 881, filed Oct. 17, 2008, and claims the priority of Japanese Application No. 008-044571, filed Feb. 26, 2008, the contents of both of which are incorporated herein by reference.

TECHNICAL FIELD

The present invention relates to a reinforced electrolyte membrane used for fuel cells, a fuel cell membrane-electrode assembly, and a solid polymer electrolyte fuel cell comprising a fuel cell membrane-electrode assembly.

BACKGROUND ART

A solid polymer electrolyte fuel cell comprises a solid polymer electrolyte membrane that serves as an electrolyte and has a structure in which electrodes are separately bound to the both sides of the membrane.

It is necessary for a polymer solid electrolyte membrane to have low membrane resistance when used for fuel cells. For this reason, it is preferable that the membrane thickness be minimized. However, excessive reduction of membrane thickness is liable to result in pinhole formation during membrane forming, membrane breakage during electrode forming, or short circuits between electrodes, which has been problematic. In addition, whenever polymer solid electrolyte membranes are used for fuel cells, they are in a moist state. Therefore, moistening causes, for example swelling or deformation of polymer electrolyte membranes. This causes problems of durability in terms of pressure resistance, cross-leakage or the like during a differential pressure operation.

Hence, a thin reinforced membrane with a uniform thickness having uniform strength in both the longitudinal and lateral directions has been developed. For example, JP Patent Publication (Kokai) No. 2004-288495 A discloses a solid polymer fuel cell electrolyte membrane comprising a complex for which the tensile yield stress is 12 MPa or more in the longitudinal and lateral directions and the relative value of the tensile yield stress in the longitudinal direction to the tensile yield stress in the lateral direction (tensile yield stress in the longitudinal direction/tensile yield stress in the lateral direction) is 2.0 or less.

Meanwhile, JP Patent Publication (Kohyo) No. 2005-520002 A discloses a composite membrane that has extraordinarily improved hardness so as to reduce the occurrence of electric short circuits, thereby improving fuel cell performance and durability. In this case, an integrated composite diaphragm comprising stretched/expanded polytetrafluoroethylene, which has a morphological structure characterized by a fine structure of nodes with ultra-high extensibility (such nodes being bound to each other via fibrils), is used as an ion conductivity diaphragm having a high degree of hardness and dimensional stability and allowed to absorb ionomers.

In general, it has been attempted to form a composite of a porous body such as stretched polytetrafluoroethylene and an electrolyte material so as to reduce the occurrence of electric short circuits, thereby improving performance and durability. However, the porous body structure becomes complex. In order to improve membrane strength, proton conductivity (specifically, fuel cell performance) must be sacrificed, which is problematic.

Further, a polyelectrolyte material having high proton conductivity and excellent durability has been examined. However, when chemical resistance is imparted to such a membrane, the polymer structure becomes complex. This causes concerns of yield deterioration in the synthesis process and a sharp increase in material cost for synthesis of a novel material or the like. Furthermore, it cannot be said that sufficient polyelectrolyte material strength is achieved in such case. In addition to such problems, a membrane obtained by forming a complex of a polytetrafluoroethylene porous body and an electrolyte material has a membrane face with strength anisotropy. Accordingly, such membrane tends to become distorted in fuel cells, facilitating membrane deformation or destruction, which has been problematic.

The above problems have arisen due to lack of simultaneous achievement of improvement of electrolyte membrane strength and provision of chemical resistance. In addition, in order to improve strength based on conventional technology, it is necessary to increase the porous substrate thickness or change the fine porous substrate structure.

Hitherto, porosity has been imparted to polytetrafluoroethylene porous substrates by a stretching method. This often results in a difference between the degree of stretching in the machine direction (for sheet processing) (MD) and that in the transverse direction (TD; vertical to the MD direction). Therefore, it has been thought that it would be difficult to change the fine structure or reduce strength anisotropy in the MD and TD.

DISCLOSURE OF THE INVENTION

Therefore, it is an object of the present invention to provide a fuel cell electrolyte membrane reinforced with a porous substrate which has excellent durability and in which the amount of fluorine ions eluted as a result of deterioration of electrolyte membrane components in particular is reduced. It is another object of the present invention to provide a fuel cell membrane-electrode assembly having improved durability. Further, it is another object of the present invention to provide a solid polymer electrolyte fuel cell having high output and excellent durability with the use of the above membrane-electrode assembly. In particular, it is an object of the present invention to provide a solid polymer electrolyte fuel cell having high output and excellent durability under the high environment temperature and low environment humidity conditions that characterize fuel cell operation conditions.

The present inventors have found that the stability of a perfluorocarbon polymer having sulfonic acid groups that are electrolytes can be improved via reinforcement. In addition, the present inventors obtained a highly durable composite membrane having uniform ion conductivity by changing only the strength of the porous substrate without complicating the fine porous substrate structure.

Specifically, in a first aspect, the present invention encompasses a reinforced electrolyte membrane for fuel cell comprising a porous substrate impregnated with a polyelectrolyte liquid dispersion, which is characterized in that either the maximum tensile strength in the machine direction (for sheet processing) (MD) or the maximum tensile strength in the transverse direction (TD; vertical to the MD direction) for the electrolyte membrane is 70 N/mm$^2$ or more at an ordinary temperature (23° C.; relative humidity: 50%) or 40 N/mm$^2$ or more at a high temperature and at a high humidity (80° C.; relative humidity: 90%). Further, preferably, the mean maximum tensile strength in the machine direction (for sheet processing) (MD) and that in the transverse direction (TD; vertical to the MD direction) for the electrolyte membrane are 70 N/mm$^2$ or more and 40 N/mm$^2$ or more, respectively. As a result of reinforcement with a reinforcing film, the amount of eluted fluorine ions is reduced in the reinforced electrolyte membrane for fuel cell of the present invention. Therefore, the membrane exhibits excellent durability.

Preferably, the reinforced electrolyte membrane for fuel cell of the present invention has a relative elongation value of 0.4 to 1.0, provided that the value is obtained by designating, as a denominator, the larger of the degree of elongation in the machine direction (MD) and the degree of elongation in the transverse direction (TD; vertical to the MD direction) at the maximum tensile strength of the electrolyte membrane. When the relative elongation value is 0.4 or more, the endurance time can be improved.

As the above porous substrate, a widely known reinforcing membrane for fuel cell can be used. For example, a porous substrate composed of a fluorine resin having excellent strength and shape stability can be preferably used. Examples of such fluorine resin include polytetrafluoroethylene, a polytetrafluoroethylene-chlorotrifluoroethylene copolymer, polychlorotrifluoroethylene, polybromotrifluoroethylene, a polytetrafluoroethylene-bromotrifluoroethylene copolymer, a polytetrafluoroethylene-perfluoro vinyl ether copolymer, and a polytetrafluoroethylene-hexafluoropropylene copolymer. The degree of polymerization and the molecular weight of such fluorine resin are not particularly limited. However, in view of strength, shape stability, and the like, the weight average molecular weight of a fluorine resin is preferably approximately 10,000 to 10,000,000. Among the examples, a polytetrafluoroethylene (PTFE) membrane made porous by a stretching method is preferable.

In a second aspect, the present invention encompasses a fuel cell membrane-electrode assembly, which comprises a pair of electrodes comprising a fuel electrode to which fuel gas is supplied and an oxygen electrode to which an oxidizer gas is supplied and a polymer electrolyte membrane sandwiched between the pair of electrodes, wherein the polymer electrolyte membrane is the above reinforced electrolyte membrane for fuel cell.

In a third aspect, the present invention encompasses a solid polymer electrolyte fuel cell comprising a membrane-electrode assembly having the above reinforced electrolyte membrane for fuel cell.

As a result of reinforcement with a reinforcing membrane, the amount of eluted fluorine ions is reduced in the reinforced electrolyte membrane for fuel cell of the present invention. Therefore, the membrane exhibits excellent durability.

The reinforced electrolyte membrane for fuel cell of the present invention is a composite membrane comprising a high-strength reinforced perfluorocarbon complex having sulfonic acid groups, and it does not necessarily have a conventional specific internal fine structure (e.g., a structure with a large aspect ratio for a reinforced membrane portion having nodes bound to each other via fibrils). Also, it is a composite membrane obtained by changing reinforcement strength so as to improve Fenton's test resistance, which is a measure of the chemical stability of a perfluorocarbon polymer having sulfonic acid groups. When either the maximum tensile strength in the longitudinal direction or that in the lateral direction inside the membrane face is 70 N/mm$^2$ or more at ordinary temperature (23° C.; relative humidity: 50%) or 40 N/mm$^2$ or more at a high temperature and at a high humidity (80° C.; relative humidity: 90%) in the case of the composite membrane, the amount of eluted fluorine ions found at 80° C. via Fenton's test can be reduced by 14% to 69%, compared with conventional membranes. Further, an electrode assembly obtained by forming a catalyst layer by a general method has high durability without a decrease in the initial performance of a single fuel cell.

In addition, the composite membrane of the present invention for which a relative value of the degree of elongation in the longitudinal direction to that in the lateral direction at the maximum tensile strength is 0.4 or more has higher durability than a membrane for which the same value is less than 0.4.

BEST MODE FOR CARRYING OUT THE INVENTION

Figure 1:
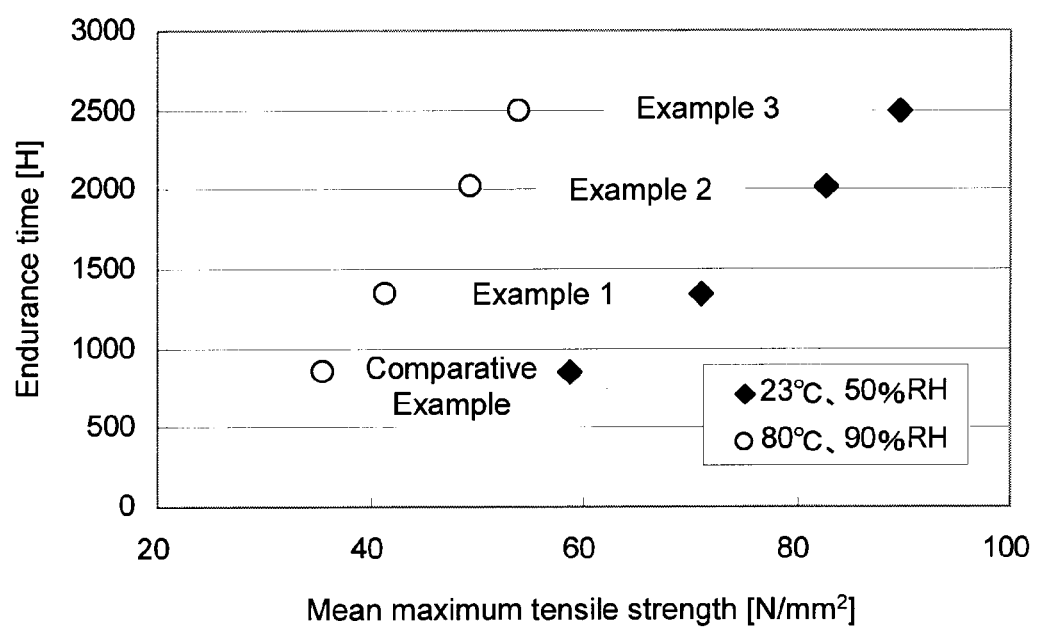
FIG. 1 shows the correlation between the mean strength and the endurance time (under ordinary temperature conditions or high temperature and high humidity conditions) for a fuel cell electrolyte membrane.

The reinforced electrolyte membrane for fuel cell of the present invention, a method for producing the same, and the functions thereof are described below.

A porous substrate used in the present invention can function as a carrier for supporting a polyelectrolyte on the surface thereof (specifically, on the internal pore surfaces). For example, a porous substrate composed of a fluorine resin having excellent strength and shape stability can be preferably used. Examples of such fluorine resin include polytetrafluoroethylene, a polytetrafluoroethylene-chlorotrifluoroethylene copolymer, polychlorotrifluoroethylene, polybromotrifluoroethylene, a polytetrafluoroethylene-bromotrifluoroethylene copolymer, a polytetrafluoroethylene-perfluoro vinyl ether copolymer, and a polytetrafluoroethylene-hexafluoropropylene copolymer. The degree of polymerization and the molecular weight of such fluorine resin are not particularly limited. However, in view of strength, shape stability, and the like, the weight average molecular weight of a fluorine resin is preferably approximately 10,000 to 10,000,000.

Also, the average pore size and the porosity of a porous substrate used in the present invention are not particularly limited. However, the average pore size is preferably approximately 0.001 μm to 100 μm and the porosity is preferably approximately 10% to 99%. If the average pore size is less than 0.001 μm, introduction of a polyelectrolyte into pores tends to be inhibited. On the other hand, if it exceeds 100 μm, electroconductivity tends to decrease due to the issufficient surface area of the porous substrate supporting a polyelectrolyte. In addition, if the porosity is less than 10%, the amount of polyelectrolyte supported in pores becomes insufficient and thus electroconductivity tends to decrease. On the other hand, if it exceeds 99%, the strength and the shape stability of the porous substrate tends to decrease.

The shape of a porous substrate used in the present invention is not particularly limited. However, a porous substrate is preferably in a film or membrane form such that the obtained composite electrolyte can be directly used in the form of a fuel cell electrolyte membrane. In such case, the thickness of a porous substrate in a film or membrane form is not particularly limited. However, the thickness is preferably approximately 1 to 50 μm. If the porous substrate thickness falls below the above lower limit, the strength of the obtained electrolyte membrane tends to decrease. On the other hand, if the thickness exceeds the upper limit, the membrane resistance of the electrolyte membrane increases. Accordingly, the electroconductivity tends to decrease.

A porous substrate used for the reinforced electrolyte membrane for fuel cell of the present invention and a method for producing the same are disclosed in JP Patent Publication (Kokoku) No. 51-18991 B (1976). Specifically, the document discloses a method for producing a porous polymer membrane comprising polytetrafluoroethylene, comprising the steps of:
(a) extruding a polytetrafluoroethylene molding product having a degree of crystallinity of approximately 95% or more by a paste extrusion molding method;
(b) removing a liquid lubricant from the molding product by drying the molding product at a temperature higher than the evaporation temperature of the liquid lubricant and lower than the crystalline melting point of polytetrafluoroethylene; and
(c) carrying out a stretching operation at a stretching rate per unit time of more than 10%/second at a temperature lower than the crystalline melting point of polytetrafluoroethylene upon stretching of the molding product at a temperature lower than the crystalline melting point of polytetrafluoroethylene in at least one direction in a manner such that the matrix tensile strength of the stretched molding product is adjusted to 14 kg/cm$^2$ or less.

Similarly, JP Patent Publication (Kohyo) No. 2006-504848 A discloses a porous substrate used for the reinforced electrolyte membrane for fuel cell of the present invention and a method for producing the same. Specifically, the document discloses a complex composed of a porous polymer membrane, provided that pores of the membrane are at least partially filled with a resin, that the bending elastic modulus of the resin (at room temperature) is approximately more than 1 GPa, and that the membrane satisfies the following condition: 75 MPa<(the longitudinal membrane tensile elasticity rate+the lateral membrane tensile elasticity rate)/2. Also, the document discloses that stretched polytetrafluoroethylene substantially contains no nodal material in a case in which a porous polymer membrane is made of stretched polytetrafluoroethylene.

More specifically, JP Patent Publication (Kohyo) No. 2006-504848 A describes as follows: (0027) It has been unexpectedly discovered that when used in a composite structure, porous polymeric membrane structures according to the invention contribute significantly to the fracture toughness of the composite. In an aspect of the invention, the membrane structure is an stretched polytetrafluoroethylene membrane that has minimal material present in non-fibrillar form, termed "nodes." In a further aspect of the invention, the membrane is substantially void of nodal material. Isotropic fibril orientation is preferred when stress may be loaded from multiple directions. When stress is anisotropic it is preferred that the greater number of fibrils be parallel to the direction of maximum stress. When multiple layer structures are contemplated, cross plying of the layers may be desirable to maximize performance. One measure of fibril orientation and density is the membrane tensile modulus. Membranes having higher moduli are preferred. (0028) Unlike traditional high modulus fiber reinforcements (e.g., glass, carbon, etc.), the membranes of this invention have substantially non-linear, membrane-like structures. In the specific case of stretched polytetrafluoroethylene membranes, the membrane does not readily wet or bond to other materials. (0037) Membranes comprising polymeric materials are preferred. Membranes comprising stretched polymers are preferred. Membranes comprising stretched PTFE are the most preferred. The polymeric membrane may comprise virtually any polymeric material, for example, vinyl polymers, styrene, acrylate, methacrylate, polyethylenes, polypropylenes, polyacrylonitrile, polyacrylamide, polyvinyl chloride, fluoropolymers including PTFE, condensation polymers, polysulfones, polyimides, polyamides, polycarbonates, polysulfides, polyesters, polyanhydrides, polyacetals, polyurethanes, polyurea, cellulose, cellulose derivatives, polysaccharides, pectinic polymers and derivatives, alginic polymers and derivatives, chitin and derivatives, phenolics, aldehyde polymers, polysiloxanes, derivatives, copolymers and blends thereof. (0038) The porous polymeric membrane film may be made by known methods. Preferred are ePTFE membranes having minimal nodal material. Most preferred are node-free ePTFE membranes. Such ePTFE membranes can be made, for example, according to the teachings of U.S. Pat. No. 5,476,589 to Bacino. Such membranes are formed through biaxial stretching of PTFE so as to create a membrane that is highly fibrillated-essentially eliminating coarse nodal structure. As a result, the structure comprises an extremely strong web of fine fibrils intersecting at fibril cross-over points. Representative of such structures can be seen in the S.E.M. Large node structures are absent from such membrane films.

The stretched PTFE material according to U.S. Pat. No. 5,476,589 can be produced as described below. A PTFE fine powder with a low amorphous content and a degree of crystallinity of at least 98% is used as a starting material. Preferred examples of a PTFE fine powder include FLUON (registered trademark) CD-123 and FLUON (registered trademark) CD-1 fine powders (ICI Americans) and a TEFLON (registered trademark) fine powder (E. I. duPont de Nemours). First, a PTFE fine powder is coagulted and then lubricated with a hydrocarbon extrusion aid, and preferably with an odorless mineral spirit such as ISOPAR (registered trademark) K (Exxon). The lubricated powder is compressed into a cylindrical form, followed by extrusion with a ram extruder. Thus, tape is formed. Two or more layers of the tape are laminated together and compressed between two rolls. The tape or tapes are compressed between rolls so as to result in an appropriate thickness of, for example, 0.1 to 1 mm. The wet tape is stretched in the lateral direction so as to result in a width 1.5 to 5 times the initial width. The tape is heated for the removal of the extrusion aid. Next, the dried tape is stretched in the longitudinal direction in a space between banks of rolls heated to a temperature below the melting point of a polymer (327° C.). For stretching in the longitudinal direction, the ratio of speed of the second bank of rolls to the first bank is designated as 10 to 100:1. Expansion in the longitudinal direction is repeated at a ratio of the same of 1 to 1.5:1. Next, the tape stretched in the longitudinal direction is further stretched in the lateral direction at a temperature below 327° C. so as to result in a width at least 1.5 times and preferably 6 to 15 times the input width of the initial extruded product in a manner such that the membrane is not allowed to contract in the longitudinal direction. While still under constraint the membrane is preferably heated to a temperature that is preferably higher than the melting point of a polymer (327° C.), followed by cooling. A particularly preferred membrane is an ePTFE membrane containing high-density fibrils oriented in a desired maximum stress direction in a complex body, which is void of nodes. Isotropic fibril orientation is preferred when stress may be applied from multiple directions. Such an ePTFE membrane is allowed to have a preferable void rate. In one embodiment of the present invention, the membrane void rate is approximately 1 vol % to 99.5 vol %. In another embodiment of the present invention, the void rate can be approximately 50% to 90%. A preferred void rate is approximately 70% to 90%. A membrane may be treated according to need so as to facilitate adhesion to a resin component. For example, treatment involving corona, plasma, or chemical oxidation can be carried out. In order to form the complex of the present invention, it is necessary to allow pores of the membrane at least to partially absorb a resin. A polymer resin is preferable. Examples thereof include a thermoplastic resin, a thermosetting resin, and a mixture composed of a combination thereof. In one embodiment of the present invention, a resin is a polymeric substance with a glass transition temperature of an amorphous component of >80° C.

A widely known polyelectrolyte can be used for the fuel cell electrolyte membrane reinforced with a porous substrate of the present invention. A preferable example is a solution obtained by dispersing or dissolving a solid polyelectrolyte having ion-exchange capacity represented by the following general formula (wherein a:b=1:1 to 9:1 and n=0, 1, or 2) in a solvent.

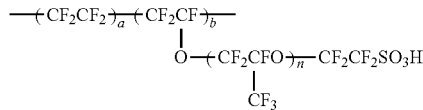

Preferably, an example of a solvent is at least one selected from the group consisting of: water; alcohols such as methanol, ethanol, propanol, n-butylalcohol, isobutylalcohol, sec-butylalcohol, and tert-butylalcohol; hydrocarbon solvents such as n-hexane; ether-based solvents such as tetrahydrofuran and dioxane; sulfoxide-based solvents such as dimethylsulfoxide and diethylsulfoxide; formamide-based solvents such as N,N-dimethylformamide and N,N-diethylformamide; acetamide-based solvents such as N,N-dimethylacetamide and N,N-diethylacetamide; pyrrolidone-based solvents such as N-methyl-2-pyrrolidone and N-vinyl-2-pyrrolidone; 1,1,2,2-tetrachloroethane; 1,1,1,2-tetrachloroethane; 1,1,1-trichloroethane; 1,2-dichloroethane; trichloroethylene; tetrachloroethylene; dichloromethane; and chloroform. In the present invention, such solvent is particularly preferable at least one selected from the group consisting of 1,1,2,2-tetrachloroethane, 1,1,1,2-tetrachloroethane, 1,1,1-trichloroethane, 1,2-dichloroethane, trichloroethylene, tetrachloroethylene, dichloromethane, and chloroform. Water and the above solvents can be used alone or in combinations of two or more.

A plurality of reinforcing porous substrates may be laminated on an electrolyte used for the fuel cell membrane-electrode assembly of the present invention. In such case, at least one porous substrate of the plurality of porous substrates is the reinforced electrolyte membrane of the present invention. The type of electrolyte membrane to be laminated is not particularly limited as long as it is a polymer membrane that can be used as electrolyte. In addition, electrolyte membranes to be laminated may be of the same type. Alternatively, different types of electrolyte membranes may be used in combination. For instance, a liquid obtained by dissolving or dispersing the following examples in a solvent can be used: perfluorinated electrolyte membranes such as a perfluorinated sulfonic acid membrane, a perfluorinated phosphonic acid membrane, a perfluorinated carboxylic acid membrane, and a PTFE composite membrane composed of any one of the above perfluorinated membranes comprising a polytetrafluoroethylene (PTFE) complex; and hydrocarbon-based electrolyte membranes such as a fluorine-containing hydrocarbon-based graft membrane, a wholly hydrocarbon-based graft membrane, and a wholly aromatic membrane.

The solid polymer electrolyte fuel cell of the present invention is a solid polymer electrolyte fuel cell comprising the aforementioned fuel cell membrane-electrode assembly of the present invention. In addition to the use of the fuel cell membrane-electrode assembly of the present invention, it is possible to conform to the configuration of a widely known solid polymer electrolyte fuel cell. With the use of the fuel cell membrane-electrode assembly of the present invention, the solid polymer electrolyte fuel cell of the present invention, which is a high-output solid polymer electrolyte fuel cell having excellent durability, can be obtained at a low cost.

EXAMPLES

The Examples and the Comparative Example of the present invention are described below.

Porous substrates used for the Examples and the Comparative Example were prepared by subjecting PTFE tape to biaxial stretching for advanced fibrillation in accordance with the method described below.

An extrusion aid (IsoperK, Exxon) was added to a PTFE fine powder (PTFE601A, Dupont) so as to result in a content of 285 mg of the aid per 1 kg of the fine powder. The PTFE fine powder to which the extrusion aid had been added was compressed so as to be formed into a cylindrical shape. The resultant was extruded with a ram extruder such that tape was formed. The extruded tape was rolled by mill rolls to a thickness of approximately 20 μm. The extrusion aid was removed from the rolled tape with the use of a fan oven at 210° C.

Next, the temperature was adjusted to a stretching temperature in the length direction listed in table 1 below. Stretching between banks of rolls in a heating zone was carried out in the length direction. Then, stretching in the lateral direction was carried out in a manner such that the membrane was not allowed to contract in the longitudinal direction in a heating zone in which the temperature was adjusted to a stretching temperature in the lateral direction as listed in table 1 below. Thereafter, heat treatment was performed at 380° C. while the membrane was fixed so as not to contract. Thus, a porous substrate was obtained.

Porous substrates used for the Comparative Example and Examples 1 to 3 were obtained by changing the stretching speed and the stretching ratio to be applied.

TABLE 1

| Sample | Stretching temperature (° C.) | | Stretching speed (%/sec) | | Stretching ratio (factor) (%) | |
|---|---|---|---|---|---|---|
| | Length direction | Width direction | Length direction | Width direction | Length direction | Width direction |
| Comparative Example | 365 | 380 | 27 | 60 | 4.2 | 7.5 |
| Example 1 | 350 | 350 | 32 | 55 | 5.0 | 15.0 |
| Example 2 | 351 | 350 | 44 | 65 | 6.8 | 14.2 |
| Example 3 | 354 | 350 | 50 | 90 | 7.5 | 22.5 |

Further, the prepared porous substrates were impregnated with a liquid mixture of a perfluorocarbon sulfonic acid resin/alcohol solvent and water (referred to as a "polyelectrolyte liquid dispersion"). Each porous substrate was fixed in a fixation frame so as not to contract. The polyelectrolyte liquid dispersion was applied to both sides of each porous substrate, followed by drying with a hair dryer for removal of the solvent. The porous substrate and the fixation frame were dried in an oven at 180° C. for 8 minutes. Each porous substrate with the corresponding fixation frame was removed from the oven. The porous substrate was separated from the fixation frame. The thus separated porous substrate/polyelectrolyte composite membrane was transparent. Therefore, the complete impregnation of the porous substrate with polyelectrolyte was confirmed. Polyelectrolyte was applied to the interlayer surfaces of three porous substrate/polyelectrolyte composite membranes prepared in the above steps. The membranes were layered and subjected to pressurization and heating at 100° C. and 3 MPa for 3 minutes. Thus, a composite membrane was prepared.

Table 2 shows the results of the tensile test under ordinary temperature conditions for the obtained composite membranes. Table 3 shows the results of the tensile test under high temperature and high humidity conditions for the obtained composite membranes. Table 4 lists ion conductivity. Table 5 lists amounts of eluted ions.

[Maximum Tensile Strength, Degree of Elongation, and Elastic Modulus]

Tensile strength was measured with a tensile tester under ordinary temperature conditions (environmental temperature and humidity: 23° C., 50% RH) or high temperature and high humidity conditions (environmental temperature and humidity: 80° C., 90% RH) (initial inter-chuck distance: 80 mm; test piece shape: rectangle with a width of 10 mm; and tensile rate: 200 mm/min). The strength and the degree of elongation at the maximum tensile strength were determined. In addition, the elastic modulus at a degree of elongation of 2% was used.

[Ion Conductivity]

Each test piece 10 mm in width was attached to a jig equipped with platinum electrodes placed at 5-mm intervals. Each jig to which a test piece had been attached was immersed in distilled water at 30±0.5° C. for 1 hour. Then, impedance was measured with an LCR meter at a measurement frequency of 100 kHz. Subsequently, proton conductivity was calculated using the following equation.

$$\kappa(S/cm)=1/\text{impedance}(\Omega)\times\text{inter-terminal distance (cm)}/\text{sample cross-sectional area}(cm^2)$$

[Amount of Eluted F Ions]

An excised membrane piece 4×5 cm in size was immersed in a Fenton's reagent ($H_2O_2$:1%; $Fe^{2+}$:100 ppm) and retained therein at 80° C. for 8 hours. Then, the amount of F ions in the reagent was measured with an ion electrode.

TABLE 2

Ordinary temperature conditions (23° C., 50% RH)

| Sample | Maximum tensile strength (N/mm²) | |
|---|---|---|
| | Machine direction (MD) | Transverse direction (TD; vertical to the MD direction) |
| Comparative Example | 56.3 | 61.0 |
| Example 1 | 65.2 | 76.9 |
| Example 2 | 82.6 | 82.5 |
| Example 3 | 85.5 | 93.7 |

TABLE 3

High temperature and high humidigy conditions (80° C., 90% RH)

| Sample | Maximum tensile strength (N/mm²) | |
|---|---|---|
| | Machine direction (MD) | Transverse direction (TD; vertical to the MD direction) |
| Comparative Example | 35.0 | 36.0 |
| Example 1 | 36.0 | 47.0 |
| Example 2 | 49.0 | 50.0 |
| Example 3 | 50.0 | 58.0 |

TABLE 4

| Sample | Ion conductivity [S/cm] |
|---|---|
| Comparative Example | 0.16 |
| Example 1 | 0.14 |
| Example 2 | 0.16 |
| Example 3 | 0.15 |

TABLE 5

| Sample | Eluted ions [%] (Comparative Example: 100%) | Amount of eluted F ions [mg/L] |
|---|---|---|
| Comparative Example | 100.0 | 1.2 |
| Example 1 | 86.2 | 1.0 |
| Example 2 | 63.8 | 0.7 |
| Example 3 | 31.0 | 0.4 |

The results listed in table 2 revealed the following facts. For the reinforced electrolyte membranes for fuel cell of Examples 1 to 3, either the maximum tensile strength in the machine direction (for sheet processing) (MD) or the maximum tensile strength in the transverse direction (TD; vertical to the MD direction) for an electrolyte membrane is 70 N/mm² or more under ordinary temperature conditions (23° C., 50% RH). On the other hand, the reinforced electrolyte membrane for fuel cell of the Comparative Example does not fall within the above specified range.

The results listed in table 3 revealed the following facts. For the reinforced electrolyte membranes for fuel cell of Examples 1 to 3, either the maximum tensile strength in the machine direction (for sheet processing) (MD) or the maximum tensile strength in the transverse direction (TD; vertical to the MD direction) for an electrolyte membrane is 40 N/mm² or more under high temperature and high humidity conditions (80° C., 90% RH). On the other hand, the reinforced electrolyte membrane for fuel cell of the Comparative Example does not fall within the above specified range.

The results listed in table 4 revealed that the reinforced electrolyte membranes for fuel cell of Examples 1 to 3 are comparable to the reinforced electrolyte membrane for fuel cell of the Comparative Example in terms of ion conductivity.

The results listed in table 5 revealed that the amount of eluted ions significantly decreases in the fuel cell reinforcing electrolyte membranes of Examples 1 to 3 along with the improvement in tensile strength, compared with the fuel cell reinforcing electrolyte membrane of the Comparative Example. That is, it is understood that the fuel cell reinforcing electrolyte membrane of the present invention has excellent durability.

Next, the reinforced electrolyte membranes for fuel cell of Examples 1 to 3 and the Comparative Example were examined in terms of fuel cell power generation performance.

Fuel cells were produced by a general method with the use of each obtained composite membrane for evaluation of initial performance and durability. The initial voltage was evaluated in the manner described below. The activation temperature was set to 80° C. The hydrogen bubbler temperature and the air bubbler temperature were set to 50° C. Hydrogen was supplied as a fuel gas to a fuel electrode with a stoichiometric ratio of 2.0:1 at a back pressure of approximately 0.1 MPa. Air was supplied as an oxidizer gas to an oxygen electrode with a stoichiometric ratio of 2.5:1 at a back pressure of approximately 0.1 MPa. Electrical discharge was performed with a load of 0.84 A/cm². The voltage value obtained 20 minutes after electrical discharge was designated as the initial voltage. Further, the endurance time was designated as corresponding to the duration of increase in the amount of hydrogen cross-leakage from the anode to cathode as a result of membrane deterioration caused by repetition of on-off switching in the above environment.

Table 6 lists the results of initial voltage determination. Table 7 lists the endurance time results for the relevant mean strength values. In addition, FIG. 1 shows the results listed in table 7.

TABLE 6

| Sample | Initial voltage [V] at 0.84 A/cm² |
|---|---|
| Comparative Example | 0.574 |
| Example 1 | 0.574 |
| Example 2 | 0.582 |
| Example 3 | 0.603 |

TABLE 7

| Sample | Average strength (ordinary temperature conditions) [N/mm²] | Average strength (high temperature and high humidity conditions) [N/mm²] | Endurance time [hour] |
|---|---|---|---|
| Comparative Example | 58.7 | 35.5 | 850 |
| Example 1 | 71.1 | 41.5 | 1345 |
| Example 2 | 82.6 | 49.5 | 2000 |
| Example 3 | 89.6 | 54.0 | 2500 |

The results listed in table 6 revealed that the reinforced electrolyte membranes for fuel cell of Examples 1 to 3 achieved initial voltage comparable to or exceeding that achieved by the reinforced electrolyte membrane for fuel cell of the Comparative Example, and therefore they have excellent power generation performance.

The results listed in table 7 revealed that there is a strong correlation between mean strength and endurance time, indicating that the reinforced electrolyte membranes for fuel cell of Examples 1 to 3 are significantly superior to the reinforced electrolyte membrane for fuel cell obtained in the Comparative Example in terms of the endurance time.

Specifically, the initial performance was maintained at a level comparable to that achieved by a conventional membrane. The endurance time was improved by more than two times.

Figure 2:
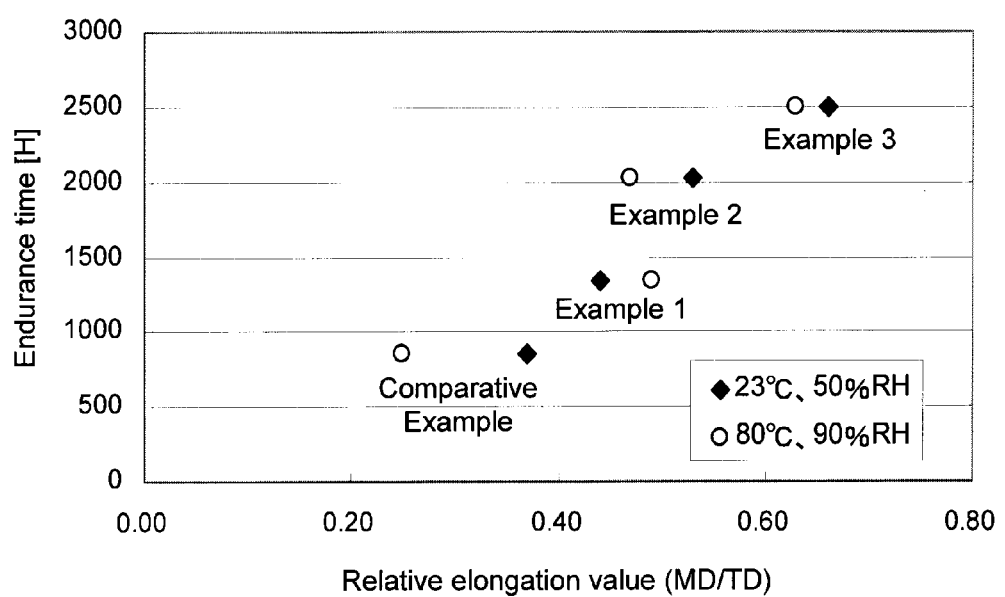
FIG. 2 shows the relationship between the endurance time and the relative elongation value (under ordinary temperature conditions or high temperature and high humidity conditions) for a fuel cell electrolyte membrane.
Figure 3:
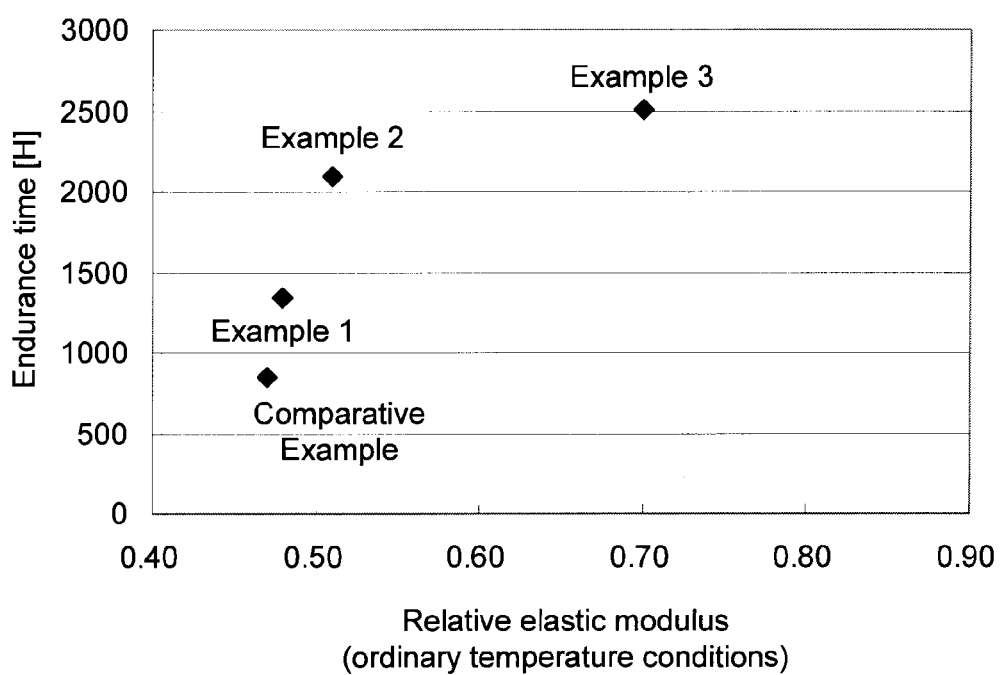
FIG. 3 shows the relationship between the endurance time and the relative elastic modulus for a fuel cell electrolyte membrane.
Figure 4:
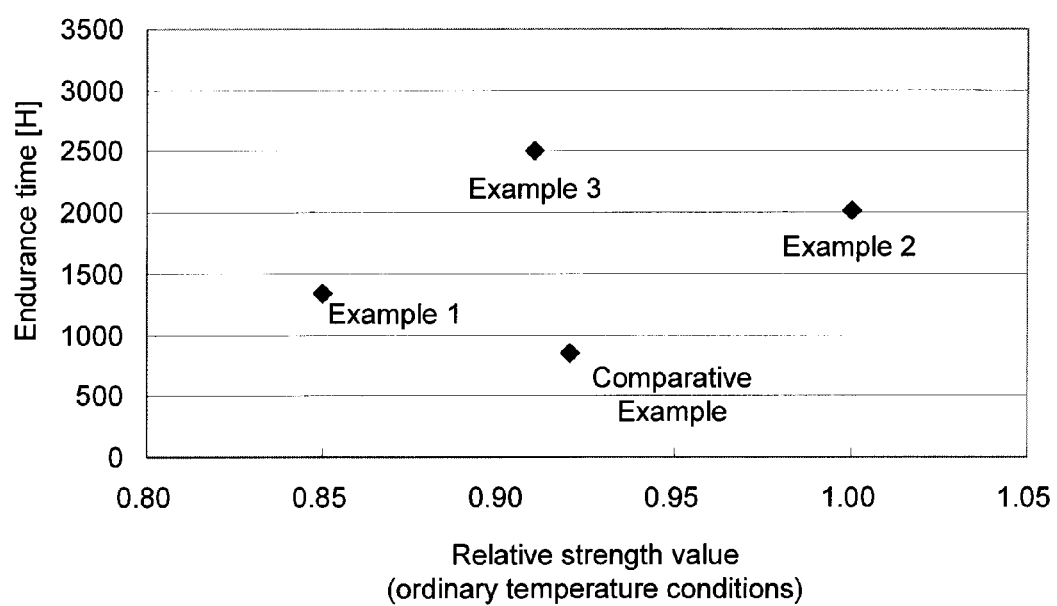
FIG. 4 shows the relationship between the endurance time and the relative strength value for a fuel cell electrolyte membrane.

Next, it was examined whether there would be a correlation between the fuel cell endurance time and the relative elongation value, the relative elastic modulus, or the relative strength value, provided that such value is obtained by designating, as a denominator, the larger of the degree of elongation, the elastic modulus, or the strength in the machine direction (MD) and the degree of elongation, the elastic modulus, or the strength in the transverse direction (TD; vertical to the MD direction) at the maximum tensile strength of the reinforced electrolyte membrane for fuel cell. Table 8 summarizes the endurance time, the relative elongation value (under room temperature conditions or high temperature and high humidity conditions), the relative elastic modulus, and the relative strength value for the reinforced electrolyte membranes for fuel cell of Examples 1 to 3 and the Comparative Example. In addition, FIG. 2 shows the relationship between the endurance time and the relative elongation value. FIG. 3 shows the relationship between the endurance time and the relative elastic modulus. FIG. 4 shows the relationship between the endurance time and the relative strength value.

TABLE 8

| Sample | Endurance time [H] | Relative elongation value — Ordinary temperature conditions | Relative elongation value — High temperature and high humidity conditions | Modulus of elasticity (ordinary temperature conditions) | Relative strength value (ordinary temperature conditions) |
|---|---|---|---|---|---|
| Comparative Example | 850 | 0.37 | 0.25 | 0.47 | 0.92 |
| Example 1 | 1345 | 0.44 | 0.49 | 0.48 | 0.85 |
| Example 2 | 2023 | 0.53 | 0.47 | 0.51 | 1.00 |
| Example 3 | 2500 | 0.66 | 0.63 | 0.70 | 0.91 |

Based on the results shown in table 8 and FIGS. 2 to 4, it was found that there was no significant correlation between the endurance time and the relative elastic modulus or the relative strength value for the reinforced electrolyte membranes for fuel cell. However, there was a strong correlation between the endurance time and the relative elongation value. Specifically, each of the reinforced electrolyte membranes for fuel cell of Examples 1 to 3 with a relative elongation value of 0.4 to 1.0 was found to be superior in terms of durability to the reinforced electrolyte membrane for fuel cell of the Comparative Example, which had a relative elongation value of less than 0.4. In addition, as in the case of evaluation under ordinary temperature conditions, the endurance time was found to be prolonged for the reinforced electrolyte membranes for fuel cell of Examples 1 to 3 under high temperature and high humidity conditions in a case in which the degree of elongation was 0.4 or more, provided that the degree of elongation is obtained by designating, as a denominator, the larger of the maximum tensile strength in the machine direction (for sheet processing) (MD) and the degree of the maximum tensile strength in the transverse direction (TD; vertical to the MD direction) for an electrolyte membrane. That is to say, it is understood that there is a correlation between the endurance time and the degree of elongation.

There was a strong correlation between the endurance time and the relative elongation value. This is probably because when the relative elongation value of a fuel cell electrolyte membrane is 0.4 or more in fuel cells in which moistening and differential pressure operations are repeatedly carried out, the fuel cell electrolyte membrane conforms to deformation in a uniform manner in fuel cells. Further, as in the case of evaluation under ordinary temperature conditions, the same can apply to evaluation under high temperature and high humidity conditions that are similar to the environmental conditions inside fuel cells. Accordingly, the fuel cell electrolyte membrane can conform to deformation in an isotropic manner even in a environment in fuel cells under high temperature and humidity conditions. Therefore, such fuel cell electrolyte membrane can tolerate the repetition of drying and moistening and thus has excellent durability.

INDUSTRIAL APPLICABILITY

The fuel cell electrolyte membrane of the present invention has improved durability. Therefore, improved durability can be imparted to fuel cells composed of the same. This contributes to the practical and widespread use of fuel cells.

The invention claimed is:

1. A reinforced electrolyte membrane for a fuel cell comprising a porous substrate impregnated with a polyelectrolyte liquid dispersion, wherein either the maximum tensile strength in the machine direction for sheet processing (MD) or the maximum tensile strength in the transverse direction (TD) vertical to the MD direction for the electrolyte membrane is 40 N/mm$^2$ or more at 80° C. at a relative humidity of 90%,
wherein the relative elongation value is 0.4 to 1.0, provided that the value is obtained by designating, as a denominator, the larger of the degree of elongation in the machine direction (MD) and the degree of elongation in the transverse direction (TD) vertical to the MD direction at the maximum tensile strength of the electrolyte membrane.

2. The reinforced electrolyte membrane for a fuel cell according to claim 1, wherein the porous substrate is a polytetrafluoroethylene (PTFE) membrane made porous by stretching.

3. A fuel cell membrane-electrode assembly, which comprises a pair of electrodes comprising a fuel electrode to which fuel gas is supplied and an oxygen electrode to which an oxidizer gas is supplied and a polymer electrolyte membrane sandwiched between the pair of electrodes, wherein the polymer electrolyte membrane is the reinforced electrolyte membrane for fuel cell according to claim 1.

4. A solid polymer electrolyte fuel cell comprising a membrane-electrode assembly having the reinforced electrolyte membrane for fuel cell according to claim 1.

5. The fuel cell membrane-electrode assembly according to claim 3, wherein the porous substrate is a polytetrafluoroethylene (PTFE) membrane made porous by stretching.

6. The solid polymer electrolyte fuel cell according to claim 4, wherein the porous substrate is a polytetrafluoroethylene (PTFE) membrane made porous by stretching.

* * * * *

UNITED STATES PATENT AND TRADEMARK OFFICE
CERTIFICATE OF CORRECTION

PATENT NO. : 8,795,923 B2
APPLICATION NO. : 12/919276
DATED : August 5, 2014
INVENTOR(S) : Yasuhiro Akita et al.

Page 1 of 1

It is certified that error appears in the above-identified patent and that said Letters Patent is hereby corrected as shown below:

In the Specification

Column 1, line 12, please change "No. PCT/JP2008/06881" to --No. PCT/JP2008/068881--.

Column 1, line 14, please change "008-044571" to --2008-044571--.

Column 1, line 14, please change "ratio of2.0:1" to --ratio of 2.0:1--.

Signed and Sealed this
Second Day of June, 2015

Michelle K. Lee
*Director of the United States Patent and Trademark Office*